US011584875B2

(12) United States Patent
Goepfert et al.

(10) Patent No.: US 11,584,875 B2
(45) Date of Patent: *Feb. 21, 2023

(54) COOLANT

(71) Applicant: WEISS UMWELTTECHNIK GMBH, Reiskirchen (DE)

(72) Inventors: Tobias Goepfert, Dresden (DE); Ullrich Hesse, Affalterbach (DE); Christian Haack, Marburg (DE)

(73) Assignee: WEISS TECHNIK GMBH, Reiskirchen (DE)

( * ) Notice: Subject to any disclaimer, the term of this patent is extended or adjusted under 35 U.S.C. 154(b) by 268 days.

This patent is subject to a terminal disclaimer.

(21) Appl. No.: 16/645,143

(22) PCT Filed: Aug. 23, 2018

(86) PCT No.: PCT/EP2018/072819
§ 371 (c)(1),
(2) Date: Mar. 6, 2020

(87) PCT Pub. No.: WO2019/048250
PCT Pub. Date: Mar. 14, 2019

(65) Prior Publication Data
US 2021/0040366 A1  Feb. 11, 2021

(30) Foreign Application Priority Data

Sep. 8, 2017  (DE) ............ 10 2017 120 786.4
Sep. 14, 2017 (DE) ............ 10 2017 216 363.1

(51) Int. Cl.
C09K 5/04 (2006.01)
G01N 1/42 (2006.01)

(52) U.S. Cl.
CPC ............ C09K 5/045 (2013.01); G01N 1/42 (2013.01); C09K 2205/106 (2013.01); C09K 2205/122 (2013.01); C09K 2205/34 (2013.01)

(58) Field of Classification Search
CPC .. F25B 2600/2501; F25B 9/006; F25B 9/008; F25B 2400/0409; F25B 2400/0411; F25B 2600/0261; F25B 7/00; F25B 40/00; G01N 17/002; G01N 1/42; C09K 5/045; C09K 2205/106; C09K 2205/122; C09K 2205/34; C09K 2205/126; C09K 2205/128
USPC ........................................ 73/863.11; 252/67
See application file for complete search history.

(56) References Cited

U.S. PATENT DOCUMENTS

| | | | |
|---|---|---|---|
| 5,736,063 A | 4/1998 | Richard et al. | |
| 5,744,052 A * | 4/1998 | Bivens | C09K 5/045 510/410 |
| 6,176,102 B1 | 1/2001 | Novak et al. | |
| 10,921,029 B2 * | 2/2021 | Haack | G01N 1/42 |
| 10,975,281 B2 * | 4/2021 | Aydin | C09K 5/045 |
| 11,237,097 B2 * | 2/2022 | Blaufelder | F25B 40/00 |
| 11,459,497 B2 * | 10/2022 | Poole | C09K 5/045 |
| 2003/0172751 A1 * | 9/2003 | Frannhagen | B01L 7/00 374/45 |
| 2004/0084652 A1 * | 5/2004 | Singh | C09K 5/045 252/75 |
| 2015/0153076 A1 * | 6/2015 | Sugimoto | F25B 9/008 62/175 |
| 2016/0018135 A1 * | 1/2016 | Yuzawa | F25B 7/00 62/175 |
| 2016/0187038 A1 * | 6/2016 | Toyooka | F25B 49/02 62/474 |
| 2017/0015935 A1 | 1/2017 | Takahashi et al. | |
| 2018/0079941 A1 * | 3/2018 | Ueno | C09K 5/044 |
| 2019/0093926 A1 * | 3/2019 | Haack | F25B 9/006 |
| 2020/0231854 A1 * | 7/2020 | Aydin | F25B 9/006 |
| 2020/0231855 A1 * | 7/2020 | Aydin | C09K 5/045 |
| 2020/0283665 A1 * | 9/2020 | Aydin | F25B 9/008 |
| 2020/0283666 A1 * | 9/2020 | Aydin | F25B 9/006 |
| 2020/0283667 A1 * | 9/2020 | Aydin | C09K 5/045 |
| 2021/0040366 A1 * | 2/2021 | Goepfert | F25B 7/00 |
| 2021/0247113 A1 * | 8/2021 | Aydin | F25B 41/31 |
| 2021/0355357 A1 * | 11/2021 | Haack | C09K 5/045 |

FOREIGN PATENT DOCUMENTS

| | | |
|---|---|---|
| CN | 1179169 C | 12/2004 |
| CN | 101914368 A | 12/2010 |
| CN | 104334982 A | 2/2015 |
| DE | 4116274 A1 | 11/1992 |
| EP | 0344397 A2 | 12/1989 |
| EP | 3051227 A1 | 8/2016 |
| JP | 2017146285 A | 8/2017 |
| WO | 9707181 A1 | 2/1997 |

(Continued)

OTHER PUBLICATIONS

Translation of JP 2017146285, Aug. 24, 2017. (Year: 2017).*
PCT English Language Translation of the International Preliminary Report on Patentability, PCT/EP2018/072819, dated Mar. 19, 2020, 9 pages.
China National Intellectual Property Administration, First Office Action and Search Report, Application No. 201880057748.1, dated Mar. 3, 2021, 15 pages [English Language Translation Only].
European Patent Office, Extended Search Report, Application No. 21204822.7, dated Jan. 28, 2022, 7 pages [No English Language Translation Available].

(Continued)

Primary Examiner — Douglas J McGinty
(74) Attorney, Agent, or Firm — Quarles & Brady LLP

(57) ABSTRACT

A refrigerant for a cooling device (10) comprising a cooling circuit (11) with at least one heat exchanger, in which the refrigerant undergoes a phase transition, the refrigerant being a refrigerant mixture composed of a mass fraction of carbon dioxide and a mass fraction of at least one other component, wherein the mass fraction of carbon dioxide in the refrigerant mixture is 10 to 50 mass percent, preferably 30 to 50 mass percent, the other component being pentafluoroethane and/or difluoromethane.

14 Claims, 4 Drawing Sheets

(56) References Cited

FOREIGN PATENT DOCUMENTS

WO  2016194847 A1  12/2016
WO  2017157864 A1  9/2017

OTHER PUBLICATIONS

Di Nicola et al., Blends of Carbon Dioxide and HFCs as Working Fluids for the Low-Temperature Circuit in Cascade Refrigerating Systems, International Journal of Refrigeration, 2005, 28:130-140.
PCT Search Report and Written Opinion dated Nov. 12, 2018 in connection with PCT/EP2018/072819.
Japan Patent Office, Notice of Reasons for Rejection, Application No. 2020-535296, dated Jun. 28, 2022, 6 pages [English language translation only].

* cited by examiner

COOLANT

CROSS-REFERENCE TO RELATED APPLICATIONS

This application represents the national stage entry of PCT International Patent Application No. PCT/EP2018/072819 filed Aug. 23, 2018, which claims priority to German Patent Application No. DE 10 2017 120 786.4 filed Sep. 8, 2017 and German Patent Application No. DE 10 2017 216 363.1 filed Sep. 14, 2017. The contents of these applications are hereby incorporated by reference as if set forth in their entirety herein.

The disclosure relates to a refrigerant for a cooling device and to a test chamber with the refrigerant and to a use of a refrigerant, the refrigerant for a cooling device which comprises a cooling circuit with at least one heat exchanger in which the refrigerant undergoes a phase transition consisting of a refrigerant mixture composed of a mass fraction of carbon dioxide and a mass fraction of at least one other component.

Refrigerants of this kind typically circulate within a closed cooling circuit of cooling devices and undergo a sequence of different changes in state of matter. Refrigerants should be of such a nature that they can be used in a cooling circuit within a predefined temperature difference. Single-component refrigerants and refrigerant mixtures of at least two components are known from the state of the art. The refrigerants are classified according to DIN 8960 Section 6.

As per statutory regulations, a refrigerant must not significantly contribute to the depletion of ozone in the atmosphere or to global warming. This means that essentially no fluorinated or chlorinated substances can be used as refrigerants, which is why natural refrigerants or gasses are an option. Moreover, a refrigerant should be nonflammable in order to not complicate filling, shipping and operation of a cooling circuit because of any safety regulations that may have to be observed. Also, production of a cooling circuit becomes more expensive if a flammable refrigerant is used because of the constructional measures required in that case. Flammability refers to the refrigerant's property of reacting to ambient oxygen by releasing heat. A refrigerant is flammable in particular if it is classified in fire class C of European standard EN2 and DIN 378 classes A2, A2L and A3.

Moreover, a refrigerant should have a relatively low $CO_2$ equivalent; i.e., a relative global warming potential (GWP) should be as low as possible in order to avoid indirect damage to the environment in case the refrigerant is released. The GWP indicates how much a defined mass of a greenhouse gas contributes to global warming, carbon dioxide serving as the reference value. The value describes the mean warming effect over a specific period, 20 years being set here for the sake of comparability. For a definition of the relative $CO_2$ equivalent or GWP, reference is made to Intergovernmental Panel on Climate Change (IPCC), Assessment Report, Appendix 8.A, Table 8.A.1.

Refrigerants with a low GWP, such as <2500, have the disadvantage that these refrigerants tend to have a significantly lower cold capacity in the temperature ranges relevant for a cooling circuit than refrigerants with a comparatively higher GWP. A lower GWP can be achieved with refrigerant mixtures that have a comparatively high mass fraction of carbon dioxide; however, these refrigerant mixtures may have zeotropic properties due to the different substances mixed, which is undesirable in many cooling circuits.

In a zeotropic refrigerant mixture, a phase transition happens across a temperature range which is known as the temperature glide. The temperature glide refers to a difference between the boiling temperature and the dew point temperature at constant pressure. Zeotropic refrigerant mixtures typically contain a high mass fraction of a nonflammable component, which is characterized by a comparatively high GWP, however. At first glance, carbon dioxide appears to be a suitable component for a refrigerant mixture because it is nonflammable and has a low GWP. In a mixture of carbon dioxide with another component, however, it is essential that a mass fraction of a carbon dioxide has to be comparatively large if the other component is flammable. This is disadvantageous, however, because carbon dioxide has a freezing temperature or freezing point of −56.6° C., which hardly allows temperatures of up to −60° C. to be achieved at a high carbon dioxide concentration.

Also, the use of refrigerants should be as simple as possible, i.e., not require extensive technical restructuring of a cooling device. With refrigerants having a temperature glide of >3 K in particular, an expansion element and a heat exchanger or evaporator of the cooling circuit in question have to be adjusted to the evaporation temperature of the refrigerant and corresponding control has to be provided. Furthermore, a distinction must be drawn between refrigerants that are designed for static operation of a cooling device, i.e., a cooling device having a temperature at the heat exchanger or evaporator that is substantially constant over a longer period of time, and refrigerants that are designed for a dynamic cooling device, which exhibits comparatively quick temperature changes at the heat exchanger. Dynamic cooling devices of this kind are integrated in test chambers, for example, which means that a refrigerant used has to be usable within a large temperature range.

Test chambers are typically used to test physical and/or chemical properties of objects, in particular devices. For instance, temperature test chambers or climate test chambers in which temperatures in a range of −60° C. to +180° C. can be set are known. In climate test chambers, desired climatic conditions can additionally be set, to which the device or the test material is then exposed for a defined period of time. Test chambers of this kind are often or sometimes realized as mobile devices which are merely connected to a building via required supply lines and comprise all modules needed to control the temperature and climate. The temperature of a test space holding the material to be tested is typically controlled in a circulating air duct within the test space. The circulating air duct forms an air treatment space in the test space, in which heat exchangers for heating or cooling the air flowing through the circulating air duct and the test space are disposed. A fan or ventilator aspirates the air located in the test space and directs it to the respective heat exchangers in the circulating air duct. In this way, the test material can be temperature-controlled or exposed to a defined temperature change. During a test interval, a temperature can repeatedly change between a maximum temperature and a minimum temperature of the test chamber. A test chamber of this kind is known from EP 0 344 397 A2, for example.

The refrigerant circulating in a cooling circuit must be of such a nature that it can be used in the cooling circuit within the aforementioned temperature difference. In particular, a dew point temperature of the refrigerant cannot be higher than a minimum temperature of the temperature range of the cooling circuit that is to be achieved because the minimum temperature would not be achievable otherwise when the refrigerant is evaporated in the heat exchanger serving to cool the test space. The dew point temperature of azeotropic refrigerants is reached immediately behind the expansion element in the heat exchanger. Straight cooling circuits for test spaces require a very high spatial temperature stability to precisely control the temperature of the test chamber, which cannot be achieved at all or only to a limited degree using zeotropic refrigerants. High temperature stability cannot be achieved in this case because the dew point temperature or a dew point of the zeotropic refrigerant may locally shift as a function of a temperature in the test space in the area of the heat exchanger in the test space because of temperature differences. Hence, a use of zeotropic refrigerants, i.e., of refrigerants having a temperature glide, in cooling circuits of test chambers is avoided.

Furthermore, cooling devices in which a zeotropic refrigerant mixture is successively evaporated are known. This means that components of the refrigerants are evaporated one after the other by means of an expansion element. Cooling devices of this kind are also referred to as mixed fluid cascade systems and are suitable for realizing a substantially static cryogenic temperature.

Hence, the object of the present disclosure is to propose a refrigerant for a cooling device, a test chamber with a refrigerant, and a use of a refrigerant by means of which temperatures up to at least −60° C. can be achieved in an environmentally friendly and safe manner.

In the refrigerant according to the disclosure for a cooling device comprising a cooling circuit with at least one heat exchanger, the refrigerant undergoes a phase transition in the heat exchanger, the refrigerant being a refrigerant mixture composed of a mass fraction of carbon dioxide and a mass fraction of at least one other component, wherein the mass fraction of carbon dioxide in the refrigerant mixture is 10 to 50 mass percent, preferably 30 to 50 mass percent, the other component being pentafluoroethane and/or difluoromethane.

Carbon dioxide ($CO_2$) is also known as a refrigerant or component under the designation R744, pentafluoroethane ($C_2HF_5$) is known under the designation R125 and difluoromethane ($CH_2F_2$) is known under the designation R32, trifluoroethylene is known under the designation R1123, 1,1-difluoroethene ($C_2H_2F_2$) is known under the designation R1132a, and fluoroethene ($C_2H_3F$) is known under the designation R1141 according to the latest version of German industry standard DIN 8960 as prior to the priority date of the application.

The disclosure provides a refrigerant mixture of carbon dioxide and one or more fluorinated refrigerants which have a low GWP and are nonflammable or flammable to a limited degree only. A fraction of carbon dioxide has to be as low as possible because otherwise a freezing point of the refrigerant mixture would rise with an increasing mass fraction of carbon dioxide. However, a lower mass fraction of carbon dioxide reduces a GWP-reducing effect of the carbon dioxide. This is why partly fluorinated refrigerants have a significantly higher GWP than carbon dioxide, while also having an improved flame-retardant effect. Pentafluoroethane and difluoromethane in particular contain significant amounts of fluorine atoms, which leads to an undesirably high GWP. As was surprisingly found, however, a sufficiently low GWP, i.e., <150, for example, can be achieved with a refrigerant mixture containing a mass fraction of carbon dioxide of 30 to 40 mass percent with pentafluoroethane and/or difluoromethane. As was also found, a flame-retardant effect of pentafluoroethane is comparatively greater than that of carbon dioxide. Moreover, the negative properties of pentafluoroethane and of carbon dioxide can be reduced by adding difluoromethane as a third component of the refrigerant mixture. Thus, a refrigerant mixture containing pentafluoroethane and difluoromethane can be classified as nonflammable. At the same time, difluoromethane has a lower freezing temperature with carbon dioxide than with pentafluoroethane. Consequently, a mixture of pentafluoroethane, difluoromethane and carbon dioxide can achieve a lower freezing temperature than pentafluoroethane and carbon dioxide alone. Difluoromethane thus lowers the freezing point of the refrigerant mixture significantly, a certain mass fraction of carbon dioxide being required in order for the refrigerant mixture to be nonflammable. At the same time, however, difluoromethane leads to a high final compression temperature, which is why difluoromethane is suitable only within limits as a sole mixing partner for carbon dioxide. Pentafluoroethane cannot lower a freezing point of the refrigerant mixture as far as difluoromethane, but has a greater flame-retardant effect than carbon dioxide, which is advantageous.

The carbon dioxide is mixable with pentafluoroethane and/or difluoromethane in a particularly advantageous manner if the mass fraction of carbon dioxide in the refrigerant mixture is 31 to 46 mass percent. A freezing point of the refrigerant mixture can be reduced by adding the mentioned components. This reduction can be set in such a manner that the freezing point of the refrigerant mixture is lower than the intended evaporation temperature and, at the same time, the vapor pressure associated with the evaporation temperature may be higher or only slightly lower than the ambient pressure.

In an embodiment of the refrigerant, a mass fraction of carbon dioxide may be 30 to 33 mass percent, preferably 31 mass percent, and a mass fraction of pentafluoroethane may be 70 to 67 mass percent, preferably 69 mass percent. Thus, a refrigerant mixture consisting solely of carbon dioxide and pentafluoroethane may be produced in this case. Pentafluoroethane is nonflammable, which means that all mixtures containing pentafluoroethane and carbon dioxide are nonflammable. The freezing point is not reduced as far compared to difluoromethane and R1123. Its GWP of 3150 is significantly higher than that of other possible components. Hence, it may also be partly replaced with other substances in the refrigerant mixture in order to reduce the GWP of the refrigerant mixture. The flame-retardant effect of pentafluoroethane is greater than that of carbon dioxide, which means that a mass fraction of carbon dioxide in the refrigerant mixture can be reduced, which lowers the freezing point further and still ensures non-flammability but increases the GWP. Thus, mixtures of carbon dioxide, pentafluoroethane, and R1132A, R1123 and R1141 are also possible.

In another embodiment of the refrigerant, a mass fraction of carbon dioxide may be 44 to 48 mass percent, preferably 45.8 mass percent, and the mass fraction of difluoromethane may be 56 to 52 mass percent, preferably 54.2 mass percent. In this case, the refrigerant mixture may consist solely of carbon dioxide and difluoromethane. A mass fraction of carbon dioxide of at least 35 mass percent is sufficient for the refrigerant mixture to be classified as nonflammable. The freezing point is reduced further than with R125, R1132A and R1141, which is why a reduction of the freezing point can be made possible However, a GWP of difluoromethane is greater than that of R1132A, R1141, R1123 and carbon dioxide. Difluoromethane can be called a small molecule, which has the consequence that the final compression temperature of difluoromethane is higher than that of larger and heavier molecules such as pentafluoroethane when compressed under the same technical conditions. Refrigerants R410A and R410B exhibit lower final compression temperatures than difluoromethane, which is why they are particularly suitable mixing partners with carbon dioxide.

Consequently, the refrigerant mixture may be a binary mixture.

The refrigerant mixture may have trifluoroethylene, 1,1-difluoroethene or fluoroethene as an additional component. 1,1-Difluoroethene has a very low GWP, making it a suitable component for reducing the GWP. Furthermore, it has a very low freezing point and a very low normal boiling point, which makes it usable for cryogenic applications. However, 1,1-difluoroethene and fluoroethene are flammable and, if admixed, should not amount to more than 10 m % in the refrigerant mixture. Trifluoroethylene has a very low GWP, making it a suitable component for reducing the GWP. Since it is thermodynamically similar to difluoromethane, refrigerant mixtures of carbon dioxide, difluoromethane and trifluoroethylene can be produced. Similar to difluoromethane, trifluoroethylene may lead to a great reduction of the freezing point (greater than pentafluoroethane). Mass fractions of trifluoroethylene and difluoromethane may preferably be 45/55.

In another embodiment, the refrigerant may have a mass fraction of carbon dioxide of 33 to 38 mass percent, preferably 35 mass percent, a mass fraction of pentafluoroethane of 33.5 to 31 mass percent, preferably 32.5 mass percent, and a mass fraction of difluoromethane of 33.5 to 31 mass percent, preferably 32.5 mass percent. Accordingly, the refrigerant mixture may consist of no more than three components. The mass fractions of the components difluoromethane and pentafluoroethane are equal in that case. As described above, a mixture of carbon dioxide with pentafluoroethane and difluoromethane has proven particularly advantageous. This refrigerant mixture may have a temperature glide of >7 K at evaporation pressures around 1 bar. Furthermore, this refrigerant mixture leads to a concentration-dependent reduction of the freezing point. Hence, flammable and nonflammable refrigerant mixtures for different temperature applications may arise when mass fractions deviate from the indicated mass fractions.

In another embodiment, a mass fraction of carbon dioxide in the refrigerant may be 10 to 35 mass percent, in which case a mass fraction of pentafluoroethane and a mass fraction of difluoromethane together are 65 to 80 mass percent and a ratio of the mass fractions of pentafluoroethane and difluoromethane may be 0.7 to 1.3.

Furthermore, a mass fraction of carbon dioxide may be 33 to 38 mass percent, preferably 35 mass percent, and a mass fraction of refrigerant R410A or refrigerant R410B may be 67 to 62 mass percent, preferably 65 mass percent. Refrigerant R410A contains equal mass fractions of pentafluoroethane and difluoromethane. Refrigerant R410A is a ready-made refrigerant mixture easily available for purchase, which means that the refrigerant can be prepared in a cost-effective and simple manner by simply mixing carbon dioxide with R410A.

In the following Table, examples of refrigerants according to the embodiments described above are indicated.

TABLE

| Refrigerant | 1 | 2 | 3 | 4 |
|---|---|---|---|---|
| R744 (wt %) | 31 | 45.8 | 35 | 35 |
| R125 (wt %) | 69 | | | 32.5 |
| R32 (wt %) | | 54.2 | | 32.5 |
| R410A (wt %) | | | 65 | |
| Temperature glide absolute (K) | 17.1 | 15.9 | 15.7 | 15.7 |
| Temperature glide (° C.) | −77.7 to −60.6 | −78.7 to −62.8 | −77 to −61.3 | −77 to −61.3 |
| Freezing point (° C.) | −80 | −87 | −86 | −86 |

Furthermore, the refrigerant may have a temperature glide of ≥10 K, preferably ≥15 K, particularly preferably ≥18 K. A temperature glide of the refrigerant should not be >20 K so that a cooling device can be operated in a reasonable way.

The refrigerant may have a relative $CO_2$ equivalent of <2500, preferably <1500, particularly preferably <500, over 20 years. Consequently, the refrigerant may be of little harm to the environment.

The refrigerant may be nonflammable. If the refrigerant is nonflammable, the cooling circuit and a test chamber in particular can be designed more cost-effectively because no special safety measures in terms of flammability of the refrigerant will have to be observed. In this case, the refrigerant may at least not be classified in fire class C and/or refrigerant safety group A1. Moreover, shipping and transport of the cooling circuit is easier because the cooling circuit can be filled with the refrigerant before being transported, irrespective of the mode of transport. If a flammable refrigerant is used, filling may not be possible until start-up at the installation site. Furthermore, use of the nonflammable refrigerant in the presence of ignition sources is possible.

The test chamber according to the disclosure for conditioning air comprises a test space which serves to receive test material and which can be sealed against an environment and is temperature-insulated, and a temperature control device for controlling the temperature of the test space, a temperature in a temperature range of −60° C. to +180° C. being establishable within the test space by means of the temperature control device, the temperature control device having a cooling device comprising a cooling circuit with a refrigerant according to the disclosure, a heat exchanger, a compressor, a condenser and an expansion element. Regarding the advantages of the test chamber according to the disclosure, reference is made to the description of advantages of the refrigerant according to the disclosure.

By means of the temperature control device, a temperature in a temperature range of −60° C. to +180° C., preferably −80° C. to +180° C., particularly preferably −100° C. to +180° C., may be established within the test space. Unlike in a mixed fluid cascade system, the refrigerant with all components contained in the refrigerant can be evaporated at once by means of the expansion element. Since a freezing point of the carbon dioxide is −56.6° C., refrigerant mixtures that contain a large mass fraction of carbon dioxide are no longer suitable for achieving temperatures below −56.6° C., on principle. The use of the refrigerant according to the disclosure, however, allows a dew point temperature of the refrigerant of less than −60° C. to be achieved.

The cooling circuit may have an internal heat exchanger, and the internal heat exchanger may be connected to a high-pressure side of the cooling circuit upstream of the expansion element and downstream of the condenser and to a low-pressure side of the cooling circuit upstream of the compressor and downstream of the heat exchanger. By use of the internal heat exchanger and cooling of the liquefied refrigerant of the high-pressure side by means of the internal heat exchanger, temperatures below −56° C. can be reached easily. The evaporation temperature of the refrigerant cooled by means of the internal heat exchanger can be reduced at the expansion element relative to an evaporation temperature of an uncooled refrigerant. The cold capacity transferred from the low-pressure side to the high-pressure side via the internal heat exchanger can thus be used at least in part, preferably exclusively, to reduce the evaporation temperature of the refrigerant at the expansion element. Furthermore, use of a zeotropic refrigerant having a temperature glide is made possible in the first place because the location of the dew point temperature of the refrigerant or the dew point of the refrigerant can be shifted into the internal heat exchanger in this case. As a consequence of the temperature glide of the zeotropic refrigerant, the achieved dew point temperature of the refrigerant may be comparatively high and thus prevent the heat exchanger from cooling further.

Hence, only part of the refrigerant may be evaporated in the heat exchanger and the unusable part of the wet vapor portion of the refrigerant can be shifted into the internal heat exchanger. On the whole, this allows refrigerants which contain a mass fraction of carbon dioxide and which, while being environmentally friendly, have zeotropic properties to be used to establish low temperatures in a test space. Moreover, if part of the temperature glide or part of the wet vapor of the refrigerant is shifted from the heat exchanger in the test space into the internal heat exchanger, a comparatively improved temperature stability can be achieved with the zeotropic refrigerant. In this case, a cold capacity output via the heat exchanger can be generated in a section of the temperature glide only, which means that a shift of the dew point of the refrigerant in the cooling circuit has hardly any impact on a temperature stability of the heat exchanger. Furthermore, a single heat exchanger may be used to cool a fluid, i.e., the air in the test space, in this case.

The heat exchanger may be dimensioned in such a manner that only part of the refrigerant can evaporate in the heat exchanger. This results in the advantage that the dew point or the location of the dew point temperature of the refrigerant can be shifted out of the heat exchanger into the internal heat exchanger. Because of a temperature glide of the zeotropic refrigerant, partial evaporation of the refrigerant in the heat exchanger achieves a lower temperature in the heat exchanger than the following remaining evaporation of the refrigerant in the internal heat exchanger.

In one embodiment of the test chamber, the heat exchanger may be disposed in the test space. In this case, the heat exchanger may also be disposed in an air treatment space of the test space so that air circulated by a fan can come into contact with a heat exchanger. In this way, a circulated amount of air of the test space can be cooled directly in the test space by means the cooling device via the heat exchanger. The test chamber may have the cooling circuit as a sole, single cooling circuit. In this case, the cooling circuit is connected directly to the test space.

In another embodiment of the test chamber, the condenser may be realized as a cascade heat exchanger of another cooling circuit of the cooling device. Accordingly, the test chamber may have at least two cooling circuits, in which case the cooling circuit may form a second stage of the cooling device and another cooling circuit, which is disposed upstream of the cooling circuit, may form a first stage of the cooling device. In this case, the condenser serves as a cascade heat exchanger or a heat exchanger for the cooling circuit. This embodiment of a test chamber allows particularly low temperatures to be established in the test space.

The temperature control device may have a heating device comprising a heater and a heating heat exchanger in the test space. The heating device may be an electric resistance heater which heats the heating heat exchanger in such a manner that the temperature in the test space can be raised by means of the heating heat exchanger. If the heat exchanger and the heating heat exchanger can be specifically controlled by means of a control device to cool or heat the air circulated in the test space, a temperature in the temperature range indicated above can be established within the test space by means of the temperature control device. A temperature stability over time of ±1 K, preferably ±0.3 K to ±0.5 K or less than ±0.3 K, may be established in the test space during a test interval irrespective of the test material or of an operating state of the test material. A test interval is a segment of a full test period in which the test material is exposed to a substantially constant temperature or climatic condition. The heating heat exchanger may be combined with the heat exchanger of the cooling circuit in such a manner that a shared heat exchanger body through which the refrigerant can flow and which has heating elements of an electric resistance heater can be realized. The condenser may be cooled with air, water or another coolant. In principle, the condenser can be cooled using any suitable fluid. The essential aspect is that the thermal load generated at the condenser is discharged via the cooling air or the cooling water in such a manner that the refrigerant can condense until it is completely liquefied.

A first bypass having at least one controllable second expansion element may be realized in the cooling circuit, in which case the first bypass may be connected to the cooling circuit upstream of the internal heat exchanger and downstream of the condenser and the first bypass may be realized as a controllable additional internal cooling system. The first bypass may thus form a re-injection device for refrigerant. Accordingly, refrigerant can be recycled from the controllable second expansion element in the internal heat exchanger on the low-pressure side. In this case, the first bypass may be connected to the low-pressure side of the cooling circuit upstream of the internal heat exchanger and downstream of the heat exchanger. The refrigerant cooled or having its temperature level lowered by the second expansion element may be led through the internal heat exchanger and intensify cooling of the refrigerant on the high-pressure side of the internal heat exchanger. Also, a cooling capacity of the internal heat exchanger can be controlled even more precisely in this way.

A second bypass comprising at least one third expansion element may be formed in the cooling circuit, in which case the second bypass bypasses the expansion element downstream of the condenser and upstream of the internal heat exchanger and the refrigerant can be metered by means of the third expansion element in such a manner that a suction gas temperature and/or a suction gas pressure of the refrigerant can be controlled upstream of the compressor on the low-pressure side of the cooling circuit. In this way, potential overheating and damage of the compressor, which may be a compressor device, for example, can be prevented among other things. Consequently, gaseous refrigerant located upstream of the compressor can be cooled via the second bypass by actuation of the third expansion element by adding still-liquid refrigerant. The third expansion element can be actuated by means of a control device which itself is coupled to a pressure and/or temperature sensor in a cooling circuit upstream of the compressor. Particularly advantageously, a suction gas temperature of ≤30° C. can be set via the second bypass. Also, the refrigerant can be metered in such a manner that an operating time of the compressor can be controlled. On principle, it is disadvantageous for the compressor or compressor device to be switched on and off repeatedly. A service life of a compressor can be prolonged if the compressor operates for longer periods of time. A refrigerant can be led past the expansion element or the condenser via the second bypass in order to delay an automated deactivation of the compressor and to prolong an operating time of the compressor, for example.

Another bypass comprising at least one other expansion element may be formed in the cooling circuit, the other bypass bypassing the compressor downstream of the compressor and upstream of the condenser in such a manner that a suction gas temperature and/or a suction gas pressure of the refrigerant can be controlled upstream of the compressor on the low-pressure side of the cooling circuit and/or that a pressure difference between the high-pressure side and a low-pressure side of the cooling circuit can be equalized. The second bypass may additionally be equipped with a settable or controllable valve, such as a magnetic valve. Connecting the high-pressure side and the low-pressure side via the other expansion element ensures that the gaseous refrigerant thus compressed gradually flows from the high-pressure side to the low-pressure side of the cooling circuit in the event of a system standstill. This also ensures gradual pressure equalization between the high-pressure side and the low-pressure side even when the expansion element is closed. A cross-section of the other expansion element may be dimensioned in such a manner that the refrigerant flowing from the high-pressure side to the low-pressure side has only a marginal impact on the normal operation of the cooling device. At the same time, a gaseous refrigerant located upstream of the compressor may be cooled by adding the liquid refrigerant via the other bypass.

Furthermore, the internal heat exchanger may be realized as a sub-cooling section or a heat exchanger, in particular a plate heat exchanger. The sub-cooling section may simply be realized by two line sections of the cooling circuit that are in contact with each other.

The expansion element may have a throttle and a magnetic valve, in which case refrigerant can be metered via the throttle and the magnetic valve. The throttle may be a settable valve or a capillary via which refrigerant is routed by means of the magnetic valve. The magnetic valve itself may be actuated by means of a control device.

Also, the temperature control device may comprise a control device comprising at least one pressure sensor and/or at least one temperature sensor in the cooling circuit, in which case a magnetic valve can be actuated by means of the control device as a function of a measured temperature and/or pressure. The control device may comprise means for data processing which process sets of data from sensors and control the magnetic valves. In this case, a function of the cooling device may also be adjusted to the refrigerant used via an appropriate computer program, for example. Furthermore, the control device may signal a malfunction and initiate a shut-down of the test chamber, if necessary, in order to protect the test chamber and the test material from damage due to critical or undesirable operating states of the test chamber.

When a refrigerant consisting of a refrigerant mixture composed of a mass fraction of carbon dioxide of 10 to 50 mass percent, preferably 30 to 50 mass percent, and a mass fraction of at least one other component, the other component being pentafluoroethane and/or difluoromethane, is used according to the disclosure, the refrigerant is used to condition air in a test space of a test chamber, the test space serving to receive test material and being sealable against an environment and temperature-insulated, a cooling device of a temperature control device of the test chamber comprising a cooling circuit with the refrigerant, a heat exchanger, a compressor, a condenser and an expansion element is used to establish a temperature in a temperature range of −60° C. to +180° C., preferably −70° C. to +180° C., particularly preferably −80° C. to +180° C., within the test space.

The refrigerant can be cooled by means of an internal heat exchanger of the cooling circuit, which is connected to a high-pressure side of the cooling circuit upstream of the expansion element and downstream of the condenser and to a low-pressure side of the cooling circuit upstream of the compressor and downstream of the heat exchanger, of the high-pressure side, the cooling of the refrigerant of the high-pressure side by means of the internal heat exchanger being usable to lower an evaporation temperature at the expansion element. During lowering of the evaporation temperature of the refrigerant of the high-pressure side, a suction pressure of the refrigerant of the low-pressure side can be kept constant. A greater system complexity, such as in the form of additional control of the suction pressure and control of the expansion element as a function of the suction pressure, is not necessarily required in that case. In particular, the compressor may also be operated at constant output irrespective of an operating state of the cooling circuit. When piston pumps are used as compressors in particular, it is essential for them to be in operation for long periods of time and at a constant speed in order to achieve a long service live.

The refrigerant of the high-pressure side may be cooled by the refrigerant of the low-pressure side at a constant suction pressure on the low-pressure side by means of the internal heat exchanger. Consequently, the refrigerant can evaporate at constant suction pressure on an evaporation section of the cooling circuit from the expansion element up to and including the internal heat exchanger. If the suction pressure or evaporation pressure of the refrigerant is constant, the refrigerant can evaporate from the expansion element at a low evaporation temperature to the internal heat exchanger at a high evaporation temperature according to the temperature glide of the refrigerant. The dew point temperature resulting from the temperature glide may be higher than the temperature of the fluid to be cooled or of the air in the test space. Once an evaporation temperature of the refrigerant is equal to the temperature of the air to be cooled in the test space at the same suction pressure, the air cannot be cooled any further. However, the dew point temperature reached in the other heat exchanger is lower than the liquid temperature of the refrigerant on the high-pressure side of the internal heat exchanger, which means that a liquid temperature of the refrigerant can be reduced further. Accordingly, an evaporation temperature downstream of the expansion element can be lowered without changing the suction pressure, allowing further cooling of the air in the test space to be achieved.

Thus, a first portion of the refrigerant routed via the expansion element can be evaporated in the heat exchanger and a second portion of the refrigerant can be evaporated in the internal heat exchanger. An evaporation section of the cooling circuit within which the refrigerant evaporates may extend from the expansion element as far as to the internal heat exchanger. The evaporation section may run through the internal heat exchanger, in which case a dew point of the refrigerant may be located at an exit of the internal heat exchanger upstream of the compressor. A first portion/second portion ratio may change during operation of the cooling circuit as a function of a temperature in the test space or at the heat exchanger. For example, a comparatively large temperature difference between the temperature of the heat exchanger and a temperature in the test space may lead to accelerated heating of the refrigerant in the heat exchanger, which results in a shift of the dew point of the refrigerant toward an entry of the internal heat exchanger or an exit of the heat exchanger upstream of the compressor. This kind of shift of the dew point can be tolerated as long as no comparatively low temperature or target temperature has been established in the test space yet. When the temperature of the heat exchanger approaches the temperature in the test space, the dew point shifts and the second portion thus grows relative to the first portion of the refrigerant.

The evaporation temperature of the refrigerant of the high-pressure side can be lowered in a self-controlled manner. Depending on the temperature at the heat exchanger, refrigerant no longer evaporating can be discharged from the heat exchanger in the flow direction because the temperature at the heat exchanger is no longer sufficient to cause a phase transition of the refrigerant in this case. Thus, wet vapor or liquid refrigerant is re-evaporated in the internal heat exchanger because here a temperature difference between the high-pressure side and the low-pressure side can always be greater than at the heat exchanger. If a temperature of the liquid refrigerant upstream of the expansion element is reduced by means of the internal heat exchanger by the heat exchange at the internal heat exchanger, the energy density of the refrigerant upstream of the expansion element and the temperature difference thus achievable at the heat exchanger increase. The interaction of the expansion element, the heat exchanger and the internal heat exchanger does not have to be controlled, in principle.

Particularly advantageously, the cooling device is operated exclusively below the critical point of the refrigerant. If the cooling device is operated below the triple point of the refrigerant, reaching of a supercritical state of the refrigerant can be precluded. Thus, the cooling device does not have to be configured for operation in the supercritical state, which saves costs for production of the cooling device.

In particular, the constant suction pressure may also be maintained during lowering of the evaporation temperature of the refrigerant of the high-pressure side by means of the internal heat exchanger. Accordingly, the cooling of the refrigerant of the high-pressure side via the internal heat exchanger can also be exploited in part or exclusively to lower an evaporation temperature of the refrigerant at the expansion element.

A dew point temperature of the refrigerant may be higher than a minimum temperature of the temperature range. In the test chambers known from the state of the art, the minimum temperature of the temperature range can no longer be established with a refrigerant of this kind in that case, but a comparatively higher minimum temperature, which substantially corresponds to the dew point temperature of the refrigerant. In the test chamber according to the disclosure, however, a refrigerant whose dew point temperature is higher than an achievable minimum temperature of the temperature range can be used because the liquefied refrigerant on the high-pressure side can be cooled by means of the internal heat exchanger, which means that an evaporation temperature of the refrigerant at the expansion element can be comparatively lower.

The refrigerant can be evaporated absolutely at a suction pressure or evaporation pressure in a pressure range of 0.3 to 5 bar. Use of the refrigerant within that pressure range allows cost-effective production of the cooling circuit because no special pressure-resistant modules and components have to be used to construct the low-pressure side of the cooling circuit.

Also, the refrigerant can be condensed absolutely at a condensation pressure in a pressure range of 5 to 35 bar. Here, too, the high-pressure side can be constructed using modules and components that do not have to be adapted to comparatively higher pressures.

Other embodiments of a use are apparent from the description of features of the claims depending on device claim 1.

Hereinafter, preferred embodiments of the disclosure will be explained in more detail with reference to the accompanying drawings.

Figure 2:
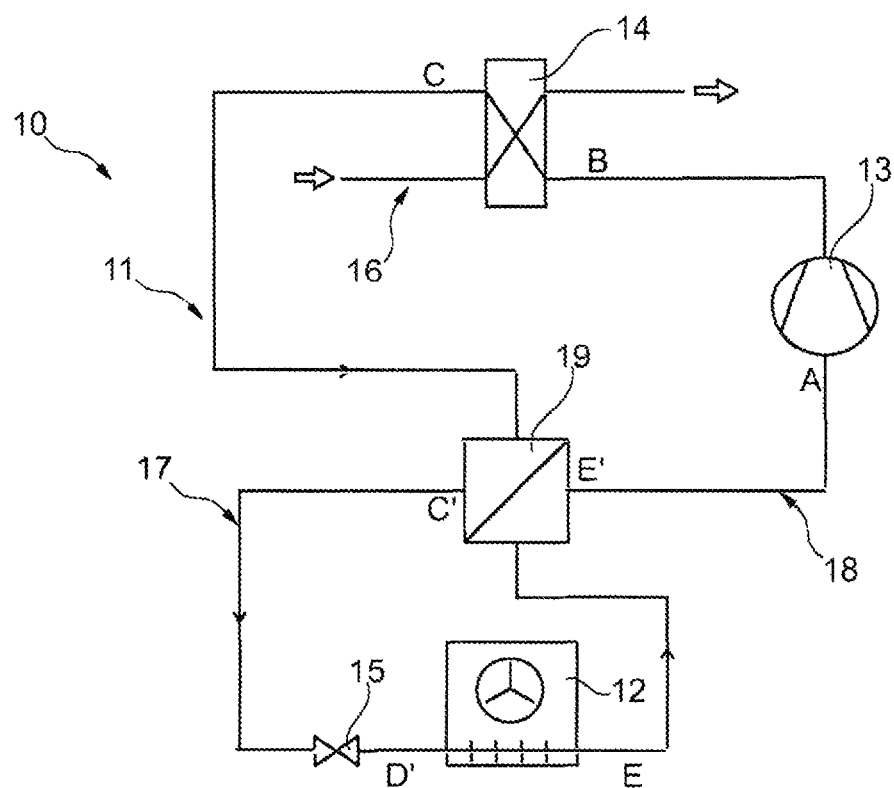
FIG. 2 is a schematic illustration of a first embodiment of a cooling device.

FIG. 2 shows a first embodiment of a cooling device 10 of a test chamber (not shown). Cooling device 10 comprises a cooling circuit 11 with a refrigerant, a heat exchanger 12, a compressor 13, a condenser 14 and an expansion element 15. Condenser 14 is cooled by another cooling circuit 16 in the case at hand. Heat exchanger 12 is disposed in a test space (not shown) of the test chamber. Furthermore, cooling circuit 11 has a high-pressure side 17 and a low-pressure side 18, to which an internal heat exchanger 19 is connected.

Figure 1:
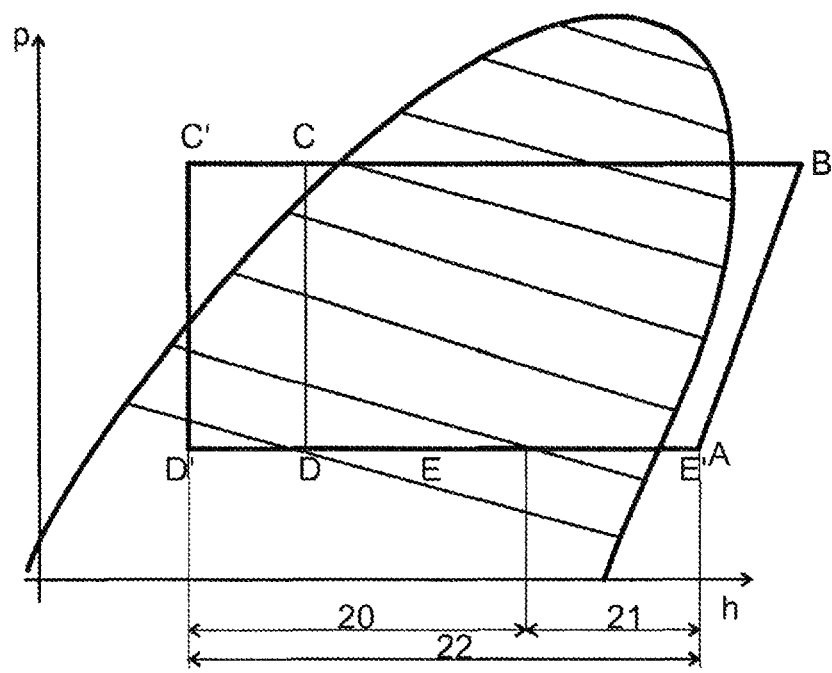
FIG. 1 is a pressure-enthalpy diagram for a refrigerant.

FIG. 1 shows a pressure-enthalpy diagram (log p/h diagram) for the refrigerant circulating in cooling circuit 11, the refrigerant being a zeotropic refrigerant. According to a combined view of FIGS. 1 and 2, starting from position A, the refrigerant upstream of compressor 13 is aspirated and compressed, whereby a pressure is achieved downstream of compressor 13 according to position B. The refrigerant is compressed by means of compressor 13 and is subsequently liquefied in condenser 14 according to position C. The refrigerant passes through internal heat exchanger 19 on high-pressure side 17, where it is cooled further, position C' upstream of expansion element 15 thus being reached. By means of internal heat exchanger 19, the portion of the wet vapor area (positons E to E') not usable in heat exchanger 12 can be used to further reduce a temperature of the refrigerant (positions C' to C). At expansion element 15, the refrigerant is relaxed (positions C' to D') and partially liquefied in heat exchanger 12 (positions D' to E). Then, the wet vapor of the refrigerant enters internal heat exchanger 19 on low-pressure side 18, where the refrigerant is re-evaporated until the dew-point temperature or the dew point of the refrigerant is reached at position E'. Hence, a first subsection 20 of an evaporation section 22 of the refrigerant runs through heat exchanger 12, a second subsection 21 of evaporation section 22 running through internal heat exchanger 19. The essential aspect is that a suction pressure of compressor 13 on low-pressure side 18 is kept constant on evaporation section 22 even if the evaporation temperature at expansion element 15 changes.

The refrigerant is a refrigerant mixture composed of a mass fraction of carbon dioxide of 30 to 50 mass percent and a mass fraction of at least one other component, the other component being pentafluoroethane and/or difluoromethane. In principle, it is possible for the refrigerants listed in the Table above to be used in cooling circuit 11 and in the cooling circuits described below.

Figure 3:
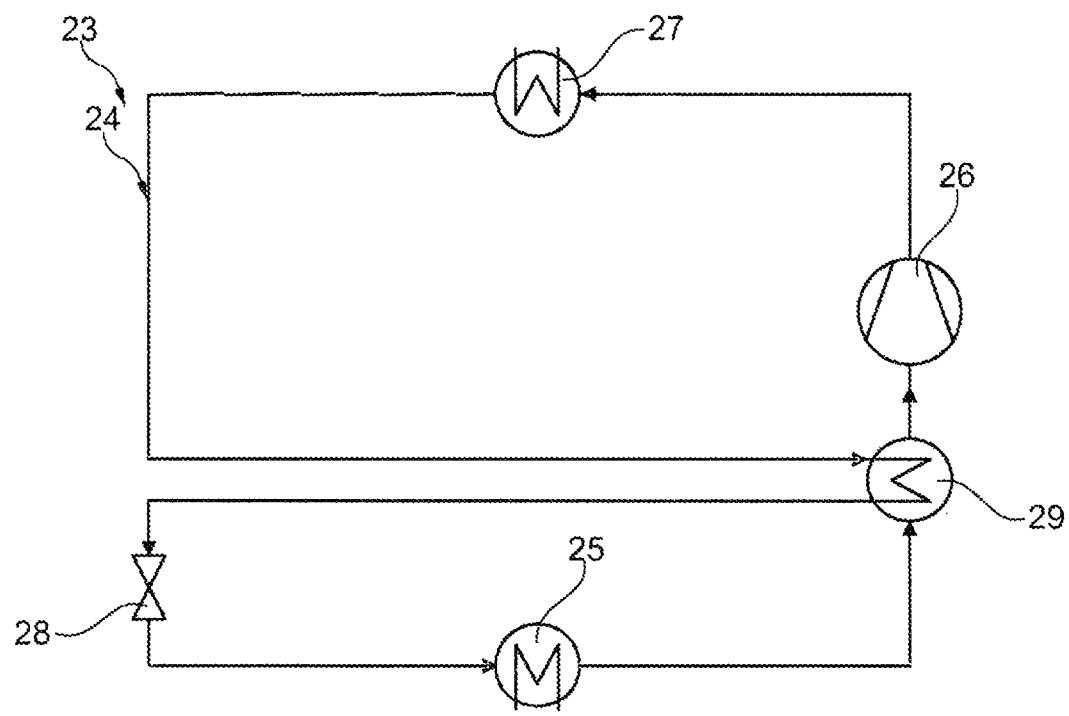
FIG. 3 is a schematic illustration of a second embodiment of a cooling device.

FIG. 3 shows a schematic illustration of a simplest embodiment of a cooling device 23, cooling device 23 being self-controlling. Cooling device 23 comprises a cooling circuit 24 with a heat exchanger 25, a compressor 26, a condenser 27, an expansion element 28 and an internal heat exchanger 29. Depending on a temperature at heat exchanger 25, refrigerant not fully evaporated escapes from heat exchanger 25 because the temperature at heat exchanger 25 or in a test space (not shown) is no longer high enough to cause a phase transition. In this case, refrigerant still liquid is re-evaporated in internal heat exchanger 29 because a temperature difference there has to be greater than at heat exchanger 25 at all times. Once the temperature of the liquid refrigerant upstream of expansion element 28 has been reduced by heat exchange in internal heat exchanger 29, the energy density and the temperature difference achievable with it at heat exchanger 25 increase. Cooling device 23 does not require elaborate control by way of sensors etc.

Figure 4:
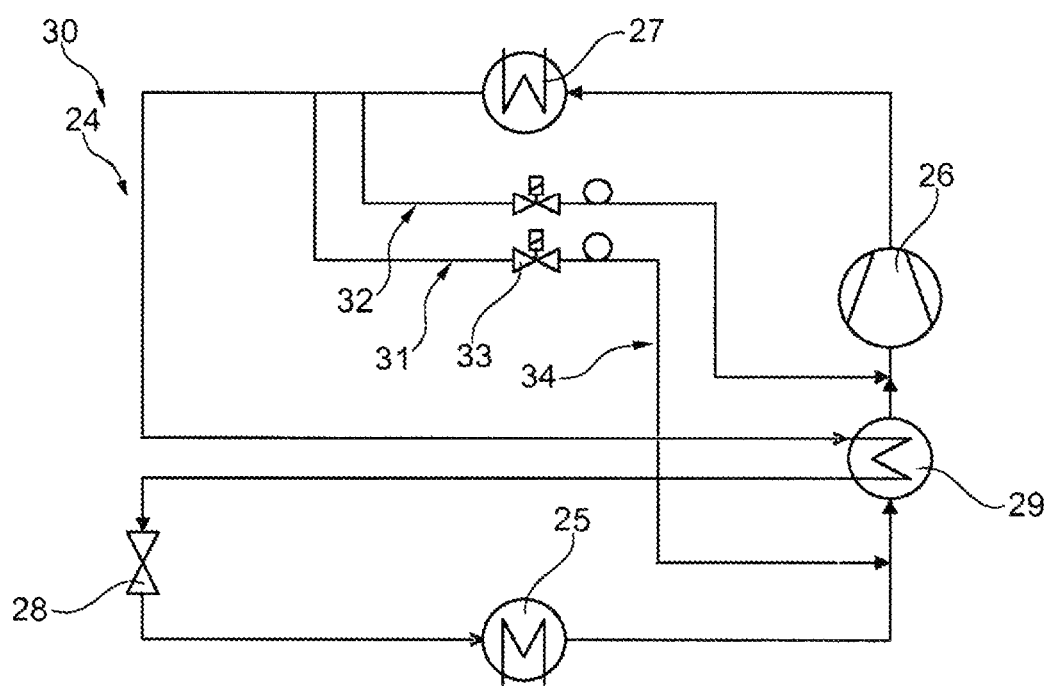
FIG. 4 is a schematic illustration of a third embodiment of a cooling device.

FIG. 4 shows a cooling device 30 which differs from the cooling device of FIG. 3 in that it has a first bypass 31 and a second bypass 32. A controllable second expansion element 33 is disposed in first bypass 31, first bypass 31 being configured as an additional internal cooling system 34. First bypass 31 is connected to cooling circuit 24 immediately downstream of condenser 27 upstream of internal heat exchanger 29 and downstream of heat exchanger 25 and upstream of internal heat exchanger 29. First bypass 31 thus bypasses expansion element 28 with heat exchanger 25, internal heat exchanger 29 being suppliable with evaporating refrigerant via second expansion element 33. A suction gas mass flow introduced into internal heat exchanger 29 can be cooled additionally by means of first bypass 31 in case of high suction gas temperatures, which may be caused by heat exchanger 25. In this way, evaporation of refrigerant upstream of the expansion element can be precluded. Hence, first bypass 31 can be used to react to changing load cases of cooling device 30. Second bypass 32 has a third expansion element 35 and is connected to cooling circuit 24 downstream of condenser 27 and upstream of internal heat exchanger 29 and downstream of internal heat exchanger 29 and upstream of compressor 26. This allows a suction gas mass flow upstream of compressor 26 to be reduced far enough via second bypass 32 to avoid inadmissibly high final compression temperatures.

Figure 5:
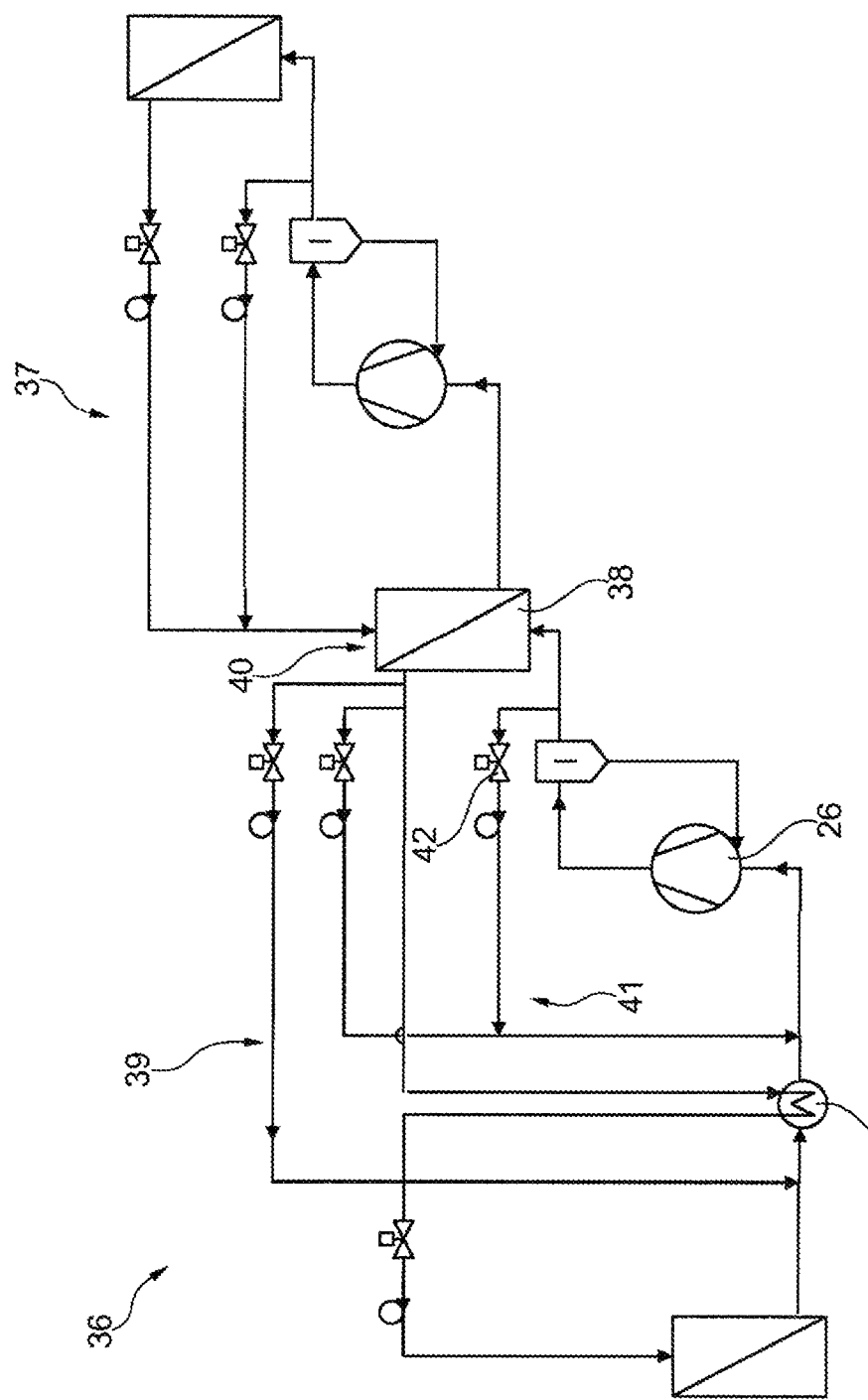
FIG. 5 is a schematic illustration of a fourth embodiment of a cooling device.

FIG. 5 shows a cooling device 36 which differs from the cooling device of FIG. 4 in that it has another cooling circuit 37. Other cooling circuit 37 serves to cool a condenser 38 of a cooling circuit 39. Condenser 38 is realized as a cascade heat exchanger 40 in the case at hand. Furthermore, cooling circuit 39 has another bypass 41 having another expansion element 42. Other bypass 41 is connected to cooling circuit 39 downstream of compressor 26 and upstream of condenser 38 and downstream of internal heat exchanger 29 and upstream of compressor 26. Thus, refrigerant not yet liquefied but compressed can flow back to upstream of compressor 26 via other bypass 41, whereby a suction gas temperature and/or a suction gas pressure of the refrigerant can be controlled.

Figure 6:
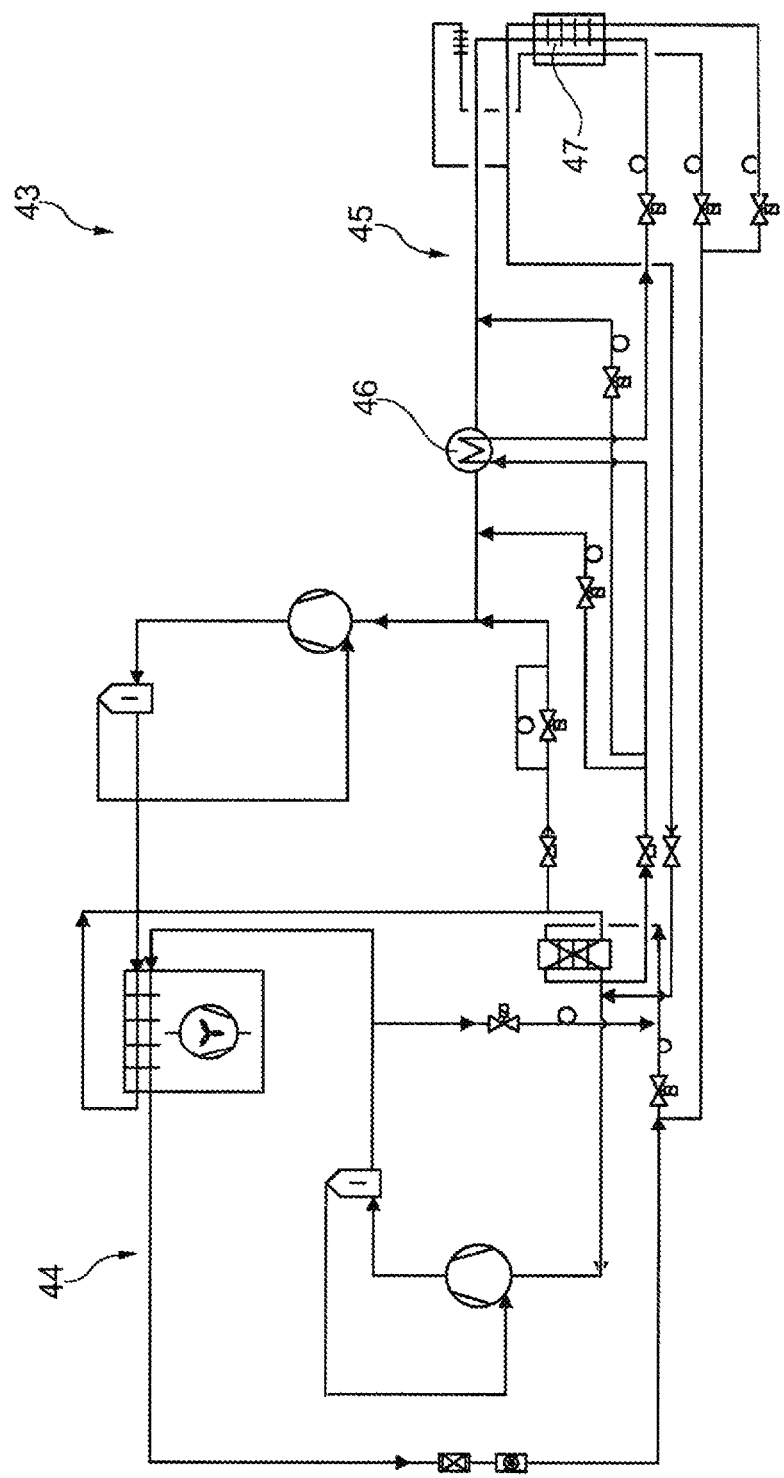
FIG. 6 is a schematic illustration of a fifth embodiment of a cooling device.

FIG. 6 shows a cooling device 30 having a cooling circuit 44 and another cooling circuit 45 and, in particular, an internal heat exchanger 46 in cooling circuit 44. In the case at hand, a heat exchanger 47 is disposed in a temperature-insulated test space of a test chamber (not shown).

The invention claimed is:

1. A refrigerant for a cooling device having a cooling circuit comprising at least one heat exchanger in which the refrigerant undergoes a phase transition, the refrigerant being a refrigerant mixture composed of a mass fraction of carbon dioxide ($CO_2$) and a mass fraction of at least one other component, wherein the mass fraction of carbon dioxide in the refrigerant mixture is 33 to 38 mass percent, the other components being pentafluoroethane ($C_2HF_5$) and difluoromethane ($CH_2F_2$), and wherein a mass fraction of pentafluoroethane is 33.5 to 31 mass percent, and a mass fraction of difluoromethane is 33.5 to 31 mass percent.

2. The refrigerant according to claim 1, wherein a mass fraction of carbon dioxide is 33 to 38 mass percent and a mass fraction of refrigerant R410A or refrigerant R410B is 67 to 62 mass percent.

3. The refrigerant according to claim 1, wherein the refrigerant is a zeotropic refrigerant and has a temperature glide of ≥10 K.

4. The refrigerant according to claim 1, wherein the refrigerant has a relative CO2 equivalent of <2500 over 20 years.

5. The refrigerant according to claim 1, wherein the refrigerant is nonflammable.

6. A test chamber for conditioning air, the test chamber comprising a test space which serves to receive test material and which can be sealed against an environment and is temperature-insulated, and a temperature control device for controlling the temperature of the test space, a temperature in a temperature range of −60° C. to +180° C. being establishable within the test space by means of the temperature control device, the temperature control device having a cooling device comprising a cooling circuit with a refrigerant according to claim 1, a heat exchanger, a compressor, a condenser and an expansion element.

7. The test chamber according to claim 6, wherein the cooling circuit has an internal heat exchanger, the internal heat exchanger being connected to a high-pressure side of the cooling circuit upstream of the expansion element and downstream of the condenser and to a low-pressure side of the cooling circuit upstream of the compressor and downstream of the heat exchanger.

8. The test chamber according to claim 6, wherein the heat exchanger is of such a size that the refrigerant can only partially evaporate in the heat exchanger.

9. The test chamber according to claim 6, wherein the condenser is realized as a cascade heat exchanger of another cooling circuit of the cooling device.

10. The test chamber according to claim 6, wherein the temperature control device has a heating device comprising a heater and a heating heat exchanger in the test space.

11. The test chamber according to claim 6, wherein a first bypass having at least one controllable second expansion element is realized in the cooling circuit, the first bypass being connected to the cooling circuit upstream of the internal heat exchanger and downstream of the condenser, the first bypass being realized as an additional controllable internal cooling.

12. A method of using a refrigerant consisting of a refrigerant mixture composed of a mass fraction of carbon dioxide ($CO_2$) of 10 to 50 mass percent, and a mass fraction of at least one other component, the other component being pentafluoroethane ($C_2HF_5$) and/or difluoromethane ($CH_2F_2$), for conditioning air in a test space of a test chamber, comprising the steps of receiving test material in the test space, sealing the test space against an environment, insulating the test space against temperature, and using a cooling device of a temperature control device of the test chamber, which comprises a cooling circuit with the refrigerant, a heat exchanger, a compressor, a condenser and an expansion element, to establish a temperature in a temperature of −60° C. to +180° C.-within the test space.

13. The method according to claim 12, further comprising the steps of using an internal heat exchanger of the cooling circuit, which is connected to a high-pressure side of the cooling circuit upstream of the expansion element and downstream of the condenser and to a low-pressure side of the cooling circuit upstream of the compressor and downstream of the heat exchanger, to cool the refrigerant of the high-pressure side, and using the cooling of the refrigerant of the high-pressure side by means of the internal heat exchanger to lower an evaporation temperature at the expansion element.

14. The method according to claim 12, further comprising the step of cooling the refrigerant of the high-pressure side by the refrigerant of the low-pressure side at a constant suction pressure on the low-pressure side by means of the internal heat exchanger.

* * * * *